April 19, 1966     E. G. DORGELO     3,247,313
ELECTRICAL INSULATOR
Original Filed June 7, 1961
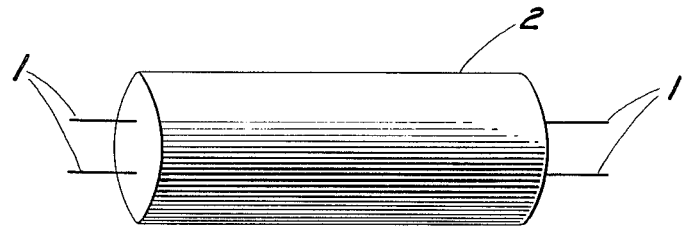
*Fig. 1.*
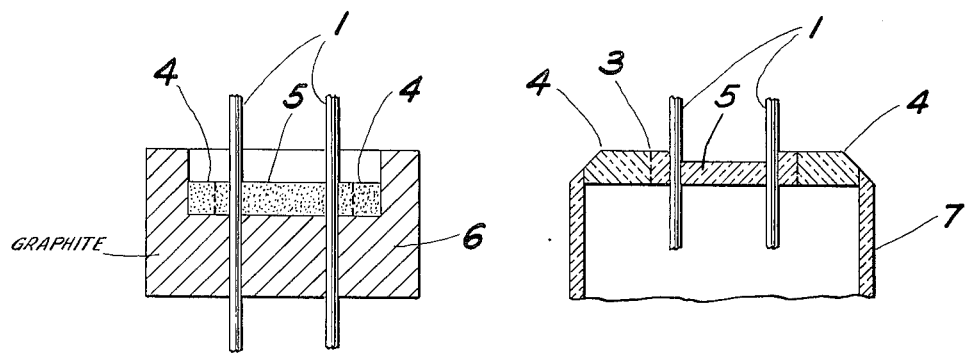
*Fig. 3.*     *Fig. 2.*
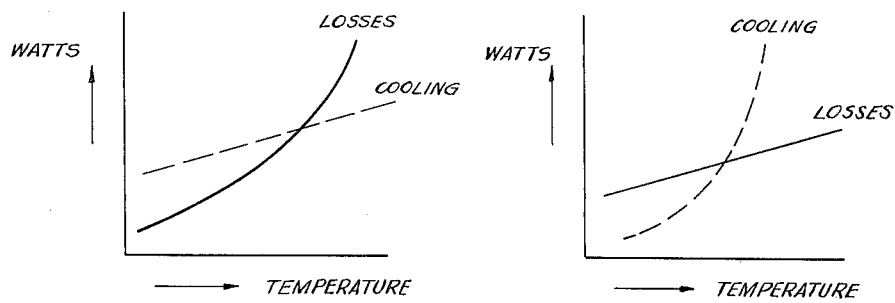
*Fig. 4.*     *Fig. 5.*
INVENTOR.
EDUARD G. DORGELO
BY
AGENT

United States Patent Office 3,247,313
Patented Apr. 19, 1966

3,247,313
ELECTRICAL INSULATOR
Eduard G. Dorgelo, Huntington, Long Island, N.Y., assignor to North American Philips Company, Inc., New York, N.Y., a corporation of Delaware
Continuation of application Ser. No. 115,469, June 7, 1961. This application Dec. 4, 1963, Ser. No. 329,603
5 Claims. (Cl. 174—50.61)

This application is a continuation of my application Serial No. 115,496, filed June 7, 1961, now abandoned.

My invention relates to electrical apparatus, and more particularly, to ways and means for electrically insulating metal parts and the like. The invention is of specific interest in the manufacture of electric discharge devices and the like.

In electric discharge tubes particularly adapted to operate at high frequencies, the field between adjacent terminals may be so strong that the glass between the terminals melts due to excessive high frequency losses. This situation may be improved by using a special low-loss glass to insulate the terminals. Such glasses exist and are commercially available. Unfortunately, most of them belong to the group of very hard glasses which means that very hot flames have to be used during the sealing operation. Furthermore, the viscosity of this glass at working temperature will be considerably different from the viscosity of adjacent parts, and there may be also a marked difference in thermal expansion.

It is an object of my invention to provide an improved means for electrically insulating metal parts and the like.

It is another object of my invention to seal electrically conductive elements in a glass envelope for an electric discharge tube adapted to operate at relatively high frequencies.

A further object of my invention is to provide an improved and simpler method of sealing electrically conductive members in a glass envelope in which a special low-loss glass is employed inbetween and around the electrically conductive elements to minimize the electrical losses in the glass and to improve the insulation therebetween.

These and further objects of my invention will be apparent as the specification progresses.

In accordance with my invention, in order to reduce losses between conductors, for example in an electric discharge tube, the conductors are surrounded by a glass portion which is easily fusible to the remainder of the envelope but between the conductors, the glass has a reduced thickness, or preferably consists of a special type of glass known as a low-loss glass.

Since the lead-in conductors of an electric discharge tube extend either through the base or the top of a glass envelope, only the base or top portion of the envelope is made of a low-loss glass which is joined to a normal glass used for the remainder of the envelope. The purpose of using a low-loss glass of the hard variety, such as an aluminosilicate glass manufactured by the Corning Glass Company and under the glass code 1723, is that such glasses have low electrical losses at high frequencies. The remainder of the envelope and of the top may consist of a borosilicate glass also made by the Corning Glass Company under the code designated 7052 since it is easier to melt in order to form a seal.

In manufacture of the tube, powder particles of the special glass are poured into a graphite mold in such a way that only a central area is covered, the remaining part of the mold then being filled with powder made from the normal glass. Thereafter, the mold is heated up to a temperature at which the special glass has reached the right viscosity. Before this temperature is reached, the normal glass had already obtained a more or less liquid state and starts to penetrate into the still unliquified central portion. After cooling down, a glass plate with sealed-in pins is obtained, the central portion of which consists of a 100% low-loss glass while the rim of the plate consists of 100% normal glass. The intermediate zone in which both glass components are mixed constitues a kind of circular graded seal, eliminating dangerous thermal stresses. Since the rim consists only of normal glass, the sealing-in operation can be accomplished in the normal routine way.

The invention will be described in connection with the accompanying drawing in which:

FIG. 1 shows an envelope of electric discharge tube provided with lead-in conductors;

FIG. 2 is a portion of the envelope showing the lead-in conductors extending through a top plate;

FIG. 3 is a mold for making the top plate of the envelope;

FIGS. 4 and 5 show typical loss and cooling curves of different types of glass.

As shown in FIG. 1, lead-in conductors 1 of an electric discharge tube extends through the base and/or top of the envelope 2 of the tube.

The top plate 3 of the envelope, as shown in FIG. 2, consists of two portions 4 and 5 made of different glass. Portion 5, which is intermediate and surrounds the lead-in conductors 1, is made of a special low-loss glass, such as an aluminosilicate glass manufactured by the Corning Glass Company under Code No. 1723, the properties of which are specified in the following table. The surrounding portion 4 of the glass plate is made of normal glass such as a borosilicate glass manufactured by the Corning Glass Company under the Code No. 7052. The following table specifies the characteristics of these glasses:

| 1. | | 2. Viscosity Data [2] | | | | 3. $Log_{10}$ of Volume Resistivity [3] | | | 4. Dielectric Properties at 1 Mc | | |
|---|---|---|---|---|---|---|---|---|---|---|---|
| Class Code | Thermal Expansion Coeff. —/° C.[1] | Strain Point, ° C. | Annealing Point, ° C. | Softening Point, ° C. | Working Point, ° C. | 25° C. | 250° C. | 350° C. | Power Factor [4] | | Dielectric Const. |
| | | | | | | | | | Room Temp.[5] | 200° C. | |
| 1723 (center) | $42 \times 10^{-7}$ | 670 | 708 | 912 | 1,176 | | 13.5 | 11.3 | 13 | 14 | 6.3 |
| 7052 (rim) | $46 \times 10^{-7}$ | 435 | 480 | 708 | 1,115 | 17 | 9.2 | 7.4 | 26 | 130 | 5.1 |

[1] From 0° to 300° C. in/in° C. or cm./cm./° C.
[2] These data subject to normal manufacturing variations.
[3] Data at 25° extrapolated from high temperature readings and are approximate only.
[4] Power factor defined as tan δ. Multiply by $10^{-4}$.
[5] This value measured at 25° C.

In the manufacture of the top plate 3 lead-in conductors 1 are placed in apertures in a graphite mold 6 (FIG. 3) and powdered particles of the special hard glass 5 are poured in such a way that only the central area and the area immediately surrounding the pins are covered. The remaining portion is then filled with powder made from normal glass, i.e., a borosilicate glass. Thereafter the mold is heated up to a temperature at which the low-loss glass has obtained the correct viscosity, 1100° C. Before this temperature is reached, the normal glass has already reached a more or less liquid state and starts to penetrate into the still unliquified portion. Upon cooling down the glass plate with sealed-in pins has a graded glass seal, the central portion of which contains 100% low-loss glass. The rim portion can then be sealed in the conventional manner to the remainder of the envelope 7.

In certain applications the temperature between adjacent terminals will rise so much that the glass between the terminals melts due to excessive electric losses. Whether or not this phenomenon will occur depends upon the slope of the losses versus temperature curve in relation to the cooling curve. This is demonstrated in FIGS. 4 and 5. In FIG. 4, the dielectric losses rise rapidly with temperature. Such is the case with glass having a high positive value of the temperature coefficient of the dielectric loss factor. The power (watts) carried off by cooling is shown to be only slightly dependent on temperature. The point of intersection in this case is an unstable point and it is clear that any increase in temperature above the equilibrium value gives rise to a further increase. Under these conditions, the glass will melt after a short time.

In FIG. 5 cooling is improved and at the same time a material with a low positive value of the temperature coefficient of the power factor has been shown. As can easily be seen, the point of intersection now indicates a stable equilibrium. It should be noted, however, that in the latter case, the loss factor itself may be quite high. However, it is important that the temperature coefficient of the loss factor of the glass have a low value.

In principle, the glass between the lead-in conductors may have a higher or lower viscosity than the surrounding glass, the only requirements being that it has a low temperature coefficient of the loss factor and that, if the glasses have different coefficients of expansion, excessive thermal stresses be prevented by a graded seal being formed between the two types of glass. The invention is primarily concerned with reducing the losses in the glass between conductors provided by electrical fields between the conductors. If a low-loss glass of reduced thickness is used between the conductors and a normal glass, which is easily fusible, around the conductors, a further improvement can be obtained. Consequently, the invention is not limited to the specific glasses described herein, since other glasses having similar characteristics may be used.

While I have thus described my invention in connection with the specific embodiments thereof, other modifications will be readily apparent to those skilled in the art without departing from the spirit and scope of the invention.

What is claimed is:

1. An envelope for an electric discharge tube having a portion through which electrically conductive elements extend spaced by electrically insulating zones, said envelope portion comprising a first part which extends between and immediately surrounds the conductive elements and consists of a glass having a power factor of less than $20 \times 10^{-4}$, and a second part immediately abutting said first part and spaced from said conductive elements consisting of a glass having a power factor exceeding $20 \times 10^{-4}$, said second part having a lower melting point than that of the glass of the first part to facilitate sealing thereof to remaining portions of the envelope.

2. An envelope for an electric discharge tube as claimed in claim 1 in which the thermal coefficient of expansion of the glass of the first part of approximately $42 \times 10^{-7}$ and that of the second part approximately $46 \times 10^{-7}$.

3. An envelope for an electric discharge tube as claimed in claim 2 in which the glass of the first part is an aluminosilicate glass and that of the second part a borosilicate glass.

4. An envelope for an electric discharge tube as claimed in claim 3 in which the thickness of the first part between the conductive elements is less than that of the surrounding glass parts.

5. An envelope for an electric discharge tube as claimed in claim 1 in which the temperature coefficient of the power factor for the glass of the first part is substantially smaller than that of the glass of the second part.

References Cited by the Examiner

UNITED STATES PATENTS

| | | | |
|---|---|---|---|
| 1,830,526 | 11/1931 | Bossard | 174—50 X |
| 1,968,854 | 8/1934 | Pirani et al. | 313—221 |
| 2,177,728 | 10/1939 | Krefft et al. | 313—221 X |
| 3,123,470 | 3/1964 | De Nison | 65—43 |

OTHER REFERENCES

Phillips Technical Review: "The Sealing of Metal Leads Through Hard Glass and Silica," B. Jonas, pp. 11–12.

JOHN F. BURNS, *Primary Examiner.*

E. JAMES SAX, *Examiner.*